US011623972B2

(12) United States Patent
Anderson et al.

(10) Patent No.: US 11,623,972 B2
(45) Date of Patent: *Apr. 11, 2023

(54) SUBSTITUTED CATECHOL MONOMERS, COPOLYMERS AND METHODS FOR USE

(71) Applicant: RHODIA OPERATIONS, Paris (FR)

(72) Inventors: Eugene J. Anderson, Marlton, NJ (US); Nemesio Martinez-Castro, Paris (FR); Lichang Zhou, Lawrenceville, NJ (US)

(73) Assignee: RHODIA OPERATIONS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,590

(22) Filed: Aug. 30, 2019

(65) Prior Publication Data

US 2020/0071441 A1 Mar. 5, 2020

Related U.S. Application Data

(60) Provisional application No. 62/724,866, filed on Aug. 30, 2018.

(51) Int. Cl.
| | |
|---|---|
| *C08F 232/06* | (2006.01) |
| *C09D 5/02* | (2006.01) |
| *C08F 220/06* | (2006.01) |
| *C08F 2/22* | (2006.01) |
| *C08L 71/12* | (2006.01) |

(52) U.S. Cl.
CPC .............. *C08F 232/06* (2013.01); *C08F 2/22* (2013.01); *C08F 220/06* (2013.01); *C09D 5/024* (2013.01); *C08L 71/12* (2013.01)

(58) Field of Classification Search
CPC ........ C08F 232/06; C08F 220/06; C08F 2/22; C09D 5/024; C08L 71/12
USPC .......................................................... 524/553
See application file for complete search history.

(56) References Cited

U.S. PATENT DOCUMENTS

| | | | |
|---|---|---|---|
| 5,770,760 | A | 6/1998 | Robinson |
| 8,673,275 | B2 | 3/2014 | Kim et al. |
| 8,993,658 | B2 * | 3/2015 | Graf ..................... B05D 3/0254 524/80 |
| 9,228,041 | B2 | 1/2016 | Martinez-Castro et al. |
| 9,309,376 | B2 * | 4/2016 | Palmer, Jr. ............. C07C 43/164 |
| 10,029,967 | B2 * | 7/2018 | Anderson, Jr. ......... C07C 41/03 |
| 2013/0280434 | A1 * | 10/2013 | Graf ..................... B05D 3/0254 516/77 |
| 2014/0099276 | A1 | 4/2014 | Yang et al. |
| 2014/0114006 | A1 | 4/2014 | Palmer, Jr. |
| 2014/0178325 | A1 | 6/2014 | Martinez-Castro et al. |
| 2014/0256862 | A1 * | 9/2014 | Palmer, Jr. ............. C08G 65/02 524/148 |
| 2015/0094240 | A1 * | 4/2015 | Kilaas ..................... C07C 69/40 562/42 |
| 2015/0133604 | A1 | 5/2015 | Zong et al. |
| 2015/0266804 | A1 * | 9/2015 | Anderson, Jr. .......... C08K 5/13 524/560 |
| 2015/0266980 | A1 | 9/2015 | Martinez-Castro et al. |
| 2016/0222243 | A1 | 8/2016 | Palmer, Jr. |
| 2016/0333213 | A1 | 11/2016 | Zhou et al. |
| 2018/0208782 | A1 | 7/2018 | Steinmetz et al. |
| 2022/0071252 | A1 | 3/2022 | Markosyan et al. |
| 2022/0071442 | A1 | 3/2022 | Kurmlavage et al. |

FOREIGN PATENT DOCUMENTS

| | | | |
|---|---|---|---|
| JP | | H01299804 A | 12/1989 |

OTHER PUBLICATIONS

G. Pohlein, Emulsion Polymerization, Encyclopedia of Polymer Science and Engineering, vol. 6, pp. 1-51, John Wiley & Sons, Inc., NY, NY 1986.
A. S. Sarac, "Redox polymerization", Progress in Polymer Science 24 (1999), pp. 1149-1204.
EPO Communication regarding extended European Search Report dated May 2, 2022, for EP 19854780 filed Aug. 30, 2019.
Extended European Search Report dated Sep. 1, 2022, for EP 19856351.2 filed Aug. 30, 2019, 10 pages.
Supplementary European Search Report dated Apr. 21, 2022, for EP 19854780 filed Aug. 30, 2019.
International Search Report dated Dec. 19, 2019, for PCT/US2019/048990 filed Aug. 30, 2019.
Extended European Search Report dated Apr. 21, 2022, for EP 19853435 filed Aug. 30, 2019, 4 pages.
International Search Report dated Dec. 24, 2019, for PCT/US2019/048998 filed Aug. 30, 2019.

* cited by examiner

*Primary Examiner* — Michael M. Bernshteyn
(74) *Attorney, Agent, or Firm* — Vorys, Safer, Seymour and Pease LLP; Anthony P. Venturino; Maryellen Feehery Hank

(57) ABSTRACT

Disclosed are novel substituted catechol monomers, polymers made with the substituted catechol monomers, pH responsive polymers made with the substituted catechol monomers, and related methods. Also provided is a method of preparing an aqueous coating composition such as a latex paint including the above components.

20 Claims, No Drawings

SUBSTITUTED CATECHOL MONOMERS, COPOLYMERS AND METHODS FOR USE

CROSS-REFERENCE TO RELATED APPLICATIONS

This application claims the benefit of U.S. Provisional Application No. 62/724,866 filed Aug. 30, 2018, incorporated herein by reference in its entirety.

FIELD OF THE INVENTION

The present invention relates to novel monomers, copolymers comprising such monomers, as well as compositions and methods using such copolymers in various applications.

BACKGROUND OF THE INVENTION

Rheological additives are chemical compositions, which, added even in small amounts, modify a liquid system's rheological properties, such as viscosity and response to shear. Such additives or thickeners may be used in a variety of liquid systems including aqueous systems such as paints, aqueous inks, and personal care products and compositions for treating subterranean formations. The additives improve the rheological properties by also affecting the dispersion, suspension and emulsification of pigments, binders and other solids within a vehicle.

Hydrophobically modified alkali swellable emulsion (HASE, also known as Hydrophobically modified alkali soluble) polymer systems and alkali soluble emulsion (ASE) polymer systems are commonly employed to modify the rheological properties of aqueous emulsion systems. These polymers are substantially insoluble in water at a low pH. However, at higher pH they become swellable or soluble in water and thus exhibit thickening behavior. Under the influence of a base, organic or inorganic, the HASE particles gradually swell and expand to form a three-dimensional network by intermolecular hydrophobic aggregation between HASE copolymer chains and/or with components of the emulsion. This network, combined with the hydrodynamic exclusion volume created by the expanded HASE chains, produces a thickening effect. This network is sensitive to applied stress so it breaks down under shear and recovers when the stress is relieved. Such rheological properties are particularly desirable for paints and coatings because they make the formulation easy to apply onto a surface while providing the thickness needed for uniform coverage and avoid spattering.

These alkali-swellable and alkali-soluble polymers are carboxyl functional polymers synthesized by free radical polymerization. Generally, HASE copolymer systems can be prepared from the following monomers: (a) an ethylenically unsaturated carboxylic acid, (b) a nonionic ethylenically unsaturated monomer, and (c) an ethylenically unsaturated hydrophobic monomer.

Latex is an example of an emulsion polymer which is a water-based polymer dispersion. Latex paints are used for a variety of applications including interior and exterior, and flat, semi-gloss and gloss applications. Latex is a stable dispersion (colloidal emulsion) of rubber or plastic polymer microparticles in an aqueous medium. Latexes may be natural or synthetic.

SUMMARY OF THE INVENTION

In one aspect, described herein are unsaturated monomers according to structure (D.I):

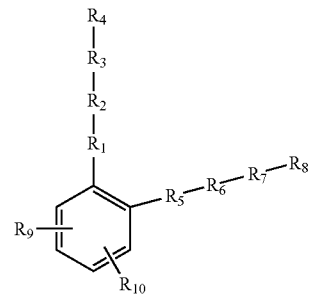

(D.I)

wherein
$R_1$ and $R_5$ are independently absent or a bivalent linking group,
$R_2$ and $R_6$ are independently a bivalent polyether group,
$R_3$ and $R_7$ are independently absent or a bivalent linking group, and
$R_4$ and $R_8$ are independently a moiety having a site of ethylenic unsaturation;
wherein $R_9$ and $R_{10}$ are independently selected from the following structures D.Ia, D.Ib, D.Ic, D.Id:

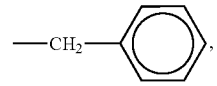

D.Ia

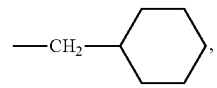

D.Ib

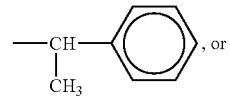

D.Ic

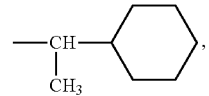

D.Id or a $C_2$-$C_{30}$ branched or linear alkyl group or alkenyl group.

In one embodiment, $R_2$ and $R_6$ are independently selected from —[CH($R_{20}$)CH($R_{21}$)O]$_x$—, wherein x is an integer of from 0 to 100, and $R_{20}$ and $R_{21}$ are independently selected from any of the following:
H; —CH$_2$OH; phenyl; —CH$_2$Cl;
a $C_1$-$C_{30}$ straight or branched alkyl or alkenyl;
—CH$_2$OR$_{22}$ wherein $R_{22}$ is $C_1$-$C_{30}$ straight or branched alkyl or alkenyl, phenyl, or alkyl substituted phenyl; or
R'COOCH$_2$— where R' is $C_1$-$C_{30}$ straight or branched alkyl or alkenyl.

In one embodiment, $R_4$ and $R_8$ are independently according to structure (D.XV):

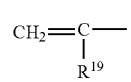

(D.XV)

wherein $R^{19}$ is H or ($C_1$-$C_4$)alkyl.

In another aspect, the invention is directed to pH responsive copolymer of a mixture of unsaturated copolymerizable monomers, the unsaturated copolymerizable monomers comprising, based on total weight of monomers:

A. about 0 to 60 weight percent, preferably 5 to 30 weight percent or 10 to 45 weight percent, of at least one $C_3$-$C_8$ alpha beta-ethylenically unsaturated acidic monomer, preferably a $C_3$-$C_8$ alpha beta-ethylenically unsaturated carboxylic acid monomer;

B. about 15 to 70 weight percent, typically 20 to 50 weight percent, of at least one non-ionic, copolymerizable $C_2$-$C_{12}$ alpha, beta-ethylenically unsaturated monomer; and C. about 0.01 to 50 weight percent (wt %), or in another embodiment 0.05 to 30 weight percent, or in another embodiment 0.5 to 10 weight percent, or in another embodiment 1 to 10 weight percent, or in another embodiment 0.5 to 9 weight percent, or in another embodiment 0.5 to 7 weight percent, or in another embodiment 4 to 10 weight percent, of at least one non-ionic ethylenically unsaturated hydrophobic monomer as described herein.

The pH responsive copolymer is also known as a HASE copolymer.

The present invention also includes compositions such as aqueous dispersions comprising this pH responsive copolymer. In particular the invention is also directed using the pH responsive copolymer as an additive for latex binders, paints and aqueous coatings. This pH responsive copolymer additive is used a thickener during formulation of the latex binders, paints and aqueous coatings, compositions for treating subterranean formations, home care and personal care. The pH responsive copolymer, in one embodiment, improves thickening efficiency in aqueous coating formulations, meaning less of the pH responsive copolymer is needed as compared with other thickeners to achieve the same rheological profile (or thickening properties). The effect of this thickening efficiency, in one embodiment, results in improved water sensitivity properties in the coating formulations or compositions.

The invention is also directed to a homogeneous, pourable liquid which improves properties in aqueous coatings, for example, improved water sensitivity. These improved properties are due to a reduction in the use level of the thickeners as described herein, needed to achieve a desired rheological profile.

The aqueous coating compositions of the invention typically include at least one latex polymer derived from at least one monomer, for example acrylic monomers. The at least one latex polymer in the aqueous coating composition can be a pure acrylic, a styrene acrylic, a vinyl acrylic or an acrylated ethylene vinyl acetate copolymer and is more preferably a pure acrylic. The at least one latex polymer is preferably derived from at least one acrylic monomer selected from the group consisting of acrylic acid, acrylic acid esters, methacrylic acid, and methacrylic acid esters. For example, the at least one latex polymer can be a butyl acrylate/methyl methacrylate copolymer or a 2-ethylhexyl acrylate/methyl methacrylate copolymer. Typically, the at least one latex polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and $C_4$-$C_8$ conjugated dienes.

Latex paint formulations typically comprise additives, e.g., at least one pigment. In a preferred embodiment of the invention the latex paint formulation includes at least one pigment selected from the group consisting of TiO2, CaCO3, clay, aluminum oxide, silicon dioxide, magnesium oxide, sodium oxide, potassium oxide, talc, barytes, zinc oxide, zinc sulfite and mixtures thereof. More preferably the at least one pigment includes TiO2, calcium carbonate or clay.

In addition to the above components, the aqueous coating composition can include one or more additives selected from the group consisting of dispersants, surfactants, rheology modifiers, defoamers, thickeners, biocides, mildewcides, colorants, waxes, perfumes and co-solvents.

Compositions of the present invention may have an absence of one or more of anionic surfactant, cationic surfactant, nonionic surfactant, zwitterionic surfactant, and/or amphoteric surfactant.

These and other features and advantages of the present invention will become more readily apparent to those skilled in the art upon consideration of the following detailed description, which describe both the preferred and alternative embodiments of the present invention.

DETAILED DESCRIPTION OF THE PREFERRED EMBODIMENTS

The present invention relates to, in one embodiment, the use of a particular family of HASE copolymers for latex dispersions, binders, paints and coatings. Described herein are aqueous compositions, for example, aqueous coating compositions. The aqueous compositions of the invention are aqueous polymer dispersions which include at least one latex polymer. Paints or other aqueous coatings of the present invention typically further include at least one pigment. In another embodiment, the latex has a Tg of less than 30° C., more typically less than 20° C., still more typically in the range from 10 to −10° C., e.g., 0° C. In one embodiment, the latex has a Tg of less than 10° C., more typically less than 5° C., still more typically in the range from 5 to −10° C., e.g., 0° C.

As used herein, the term "alkyl" means a monovalent straight or branched saturated hydrocarbon radical, more typically, a monovalent straight or branched saturated ($C_1$-$C_{40}$) hydrocarbon radical, such as, for example, methyl, ethyl, n-propyl, isopropyl, n-butyl, isobutyl, tert-butyl, hexyl, octyl, hexadecyl, octadecyl, eicosyl, behenyl, tricontyl, and tetracontyl.

As used herein, the term "alkenyl" means an unsaturated straight or branched hydrocarbon radical, more typically an unsaturated straight, branched, ($C_2$-$C_{22}$) hydrocarbon radical, that contains one or more carbon-carbon double bonds, such as, for example, ethenyl, n-propenyl, iso-propenyl.

As used herein, the term "alkoxyl" means an oxy radical that is substituted with an alkyl group, such as for example, methoxyl, ethoxyl, propoxyl, isopropoxyl, or butoxyl, which may optionally be further substituted on one or more of the carbon atoms of the radical.

As used herein, the term "alkoxyalkyl" means an alkyl radical that is substituted with one or more alkoxy substituents, more typically a ($C_1$-$C_{22}$)alkyloxy-($C_1$-$C_6$)alkyl radical, such as methoxymethyl, and ethoxybutyl.

As used herein, terms "aqueous medium" and "aqueous media" are used herein to refer to any liquid medium of which water is a major component. Thus, the term includes water per se as well as aqueous solutions and dispersions.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkoxyl, alkenyl, halo, haloalkyl, monocyclic aryl, or amino, such as, for example, phenyl, methylphenyl, methoxyphenyl, dimethylphenyl, trimethylphenyl, chlorophenyl, trichloromethylphenyl, triisobutyl phenyl, tristyrylphenyl, and aminophenyl.

As used herein, the term "arylalkyl" means an alkyl group substituted with one or more aryl groups, more typically a ($C_1$-$C_{18}$)alkyl substituted with one or more ($C_6$-$C_{14}$)aryl substituents, such as, for example, phenylmethyl, phenylethyl, and triphenylmethyl.

As used herein, the term "aryloxy" means an oxy radical substituted with an aryl group, such as for example, phenyloxy, methylphenyl oxy, isopropylmethylphenyloxy.

As used herein, the terminology "($C_x$-$C_y$)" in reference to an organic group, wherein x and y are each integers, indicates that the group may contain from x carbon atoms to y carbon atoms per group.

As used herein, the term "cycloalkenyl" means an unsaturated hydrocarbon radical, typically an unsaturated ($C_5$-$C_{22}$) hydrocarbon radical, that contains one or more cyclic alkenyl rings and which may optionally be substituted on one or more carbon atoms of the ring with one or two ($C_1$-$C_6$) alkyl groups per carbon atom, such as cyclohexenyl, cycloheptenyl, and "bicycloalkenyl" means a cycloalkenyl ring system that comprises two condensed rings, such as bicycloheptenyl.

As used herein, the term "cycloalkyl" means a saturated hydrocarbon radical, more typically a saturated ($C_5$-$C_{22}$) hydrocarbon radical, that includes one or more cyclic alkyl rings, which may optionally be substituted on one or more carbon atoms of the ring with one or two ($C_1$-$C_6$)alkyl groups per carbon atom, such as, for example, cyclopentyl, cycloheptyl, cyclooctyl, and "bicyloalkyl" means a cycloalkyl ring system that comprises two condensed rings, such as bicycloheptyl.

As used herein, an indication that a composition is "free" of a specific material means the composition contains no measurable amount of that material.

As used herein, the term "heterocyclic" means a saturated or unsaturated organic radical that comprises a ring or condensed ring system, typically comprising from 4 to 16 ring atoms per ring or ring system, wherein such ring atoms comprise carbon atoms and at least one heteroatom, such as for example, O, N, S, or P per ring or ring system, which may optionally be substituted on one or more of the ring atoms, such as, for example, thiophenyl, benzothiphenyl, thianthrenyl, pyranyl, benzofuranyl, xanthenyl, pyrolidinyl, pyrrolyl, pyradinyl, pyrazinyl, pyrimadinyl, pyridazinyl, indolyl, quinonyl, carbazolyl, phenathrolinyl, thiazolyl, oxazolyl, phenoxazinyl, or phosphabenzenyl.

As used herein, the term "hydroxyalkyl" means an alkyl radical, more typically a ($C_1$-$C_{22}$)alkyl radical, that is substituted with one or more hydroxyl groups, such as for example, hydroxymethyl, hydroxyethyl, hydroxypropyl, and hydroxydecyl.

As used herein the term "(meth)acrylate" refers collectively and alternatively to the acrylate and methacrylate and the term "(meth)acrylamide" refers collectively and alternatively to the acrylamide and methacrylamide, so that, for example, "butyl (meth)acrylate" means butyl acrylate and/or butyl methacrylate.

As used herein, "molecular weight" in reference to a polymer or any portion thereof, means to the weight-average molecular weight ("$M_w$") of the polymer or portion. $M_w$ of a polymer is a value measured by gel permeation chromatography (GPC) with an aqueous eluent or an organic eluent (for example dimethylacetamide, dimethylformamide, and the like), depending on the composition of the polymer, light scattering (DLS or alternatively MALLS), viscometry, or a number of other standard techniques. $M_w$ of a portion of a polymer is a value calculated according to known techniques from the amounts of monomers, polymers, initiators and/or transfer agents used to make the portion.

In one embodiment, the copolymers for use in the present invention exhibit a weight average molecular weight, as determined by gel permeation chromatography (GPC) and light scattering of a solution of the polymer in tetrahydrofuran and compared to a polystyrene standard, of greater than or equal to 30,000 grams per mole ("g/mole"). HASE thickeners may not fully dissolve in THF but after hydrolysis they can dissolve in water and measurement can be run in a water gel permeation chromatography (GPC). Reference: Macromolecules 2000, 33, 2480. For example in a range of 30,000 to 2,000,000 g/mole.

As used herein, the indication that a radical may be "optionally substituted" or "optionally further substituted" means, in general, unless further limited either explicitly or by the context of such reference, such radical may be substituted with one or more inorganic or organic substituent groups, for example, alkyl, alkenyl, aryl, arylalkyl, alkaryl, a hetero atom, or heterocyclyl, or with one or more functional groups capable of coordinating to metal ions, such as hydroxyl, carbonyl, carboxyl, amino, imino, amido, phosphonic acid, sulphonic acid, or arsenate, or inorganic and organic esters thereof, such as, for example, sulphate or phosphate, or salts thereof.

As used herein, "parts by weight" or "pbw" in reference to a named compound refers to the amount of the named compound, exclusive, for example, of any associated solvent. In some instances, the trade name of the commercial source of the compound is also given, typically in parentheses. For example, a reference to "10 pbw cocoamidopropylbetaine ("CAPB", as MIRATAINE BET C-30)" means 10 pbw of the actual betaine compound, added in the form of a commercially available aqueous solution of the betaine compound having the trade name "MIRATAINE BET C-30", and exclusive of the water contained in the aqueous solution.

As used herein, an indication that a composition is "substantially free" of a specific material, means the composition contains no more than an insubstantial amount of that material, and an "insubstantial amount" means an amount that does not measurably affect the desired properties of the composition.

As used herein, the term "surfactant" means a compound that reduces surface tension when dissolved in water.

"Surfactant effective amount" means the amount of the surfactant that provides a surfactant effect to enhance the stability of emulsions of the polymers.

In one embodiment, described herein are pH responsive copolymers of a mixture of unsaturated copolymerizable monomers. In one embodiment, these pH responsive copolymers are substantially insoluble in water at a low pH. However, at higher pH they become swellable or soluble in water and thus exhibit thickening behavior. Thus, the pH responsive copolymer is interchangeably termed alkali swellable copolymer or alkali soluble copolymer. Typically the pH responsive copolymer is termed an alkali-soluble emulsion (ASE) copolymer and/or a hydrophobically modified alkali-soluble emulsion (HASE) copolymer. Although this copolymer is described as ASE and/or HASE copolymer it is not necessary to make a copolymer of this structure by emulsion polymerization. The copolymer may also be made by solution polymerization and comes within the invention whether made by emulsion polymerization or solution polymerization.

In one embodiment, the copolymer comprises a chain of monomeric units. In a further embodiment, the copolymer is an ASE and/or HASE copolymer. The polymer is a macromolecule having a relatively high molecular mass that comprises chains of multiple repetitions of the monomeric units, which are derived, actually or conceptually, from molecules of relatively low molecular mass and are connected to form a linear, branched, or network structure. The copolymer typically has a linear or branched structure, more typically single strand linear or branched structure. In one embodiment, a polymer having a predominantly single strand linear or branched structure is lightly crosslinked to form a polymer network having a low density of crosslinks. As used herein the term "single strand" in regard to a polymer means monomeric units of the polymer are connected such that adjacent monomeric units are joined to each other through two atoms, one on each of the adjacent monomeric units.

The copolymer may typically be regarded as having a "backbone", or main polymer chain, from which all branches and substituent groups of the polymer may be regarded as being pendant. Where two or more chains of the copolymer could equally be considered to be the main chain of the polymer, that chain is selected as the main chain which leads to the simplest representation of the polymer molecule. The monomeric units of the copolymer may be arranged in random, alternating, tapered, or block sequence along the copolymer chain.

The ASE and/or HASE copolymer typically has a weight average molecular weight of greater than or equal to about 30,000 grams per mole, typically the copolymer has a weight average molecular weight of greater than or equal to about 30,000 to 1,000,000 grams per mole or 30,000 to 500,000 grams per mole or 50,000 to 500,000 grams per mole.

The polymer of the present invention, in one embodiment, further comprises one or more acidic monomeric units, each independently comprising at least one acid group per acidic monomeric unit.

In one embodiment, the acidic monomeric units each independently comprise, per monomeric unit, at least one group according to structure (B.I):

$$-R^{32}-R^{31} \tag{B.I}$$

wherein
$R^{31}$ is a moiety that comprises at least one carboxylic acid, sulfonic acid, or phosphoric acid group, and
$R^{32}$ is absent or is a bivalent linking group.

In one embodiment, $R^{32}$ is O, $-(CH_2)_n-O-$, or is according to structure (structure (B.II):

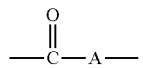

(B.II)

wherein:
n is an integer of from 1 to 6,
A is O or $NR^{17}$, and
$R^{17}$ is H or $(C_1-C_4)$alkyl.

In one embodiment, the one or more acidic monomeric units each independently comprise one or two carboxy groups per monomeric unit and may, if the acidic monomeric unit comprises a single carboxy group, further comprise an ester group according to $-CH_2COOR^{33}$, wherein $R^{33}$ is alkyl, more typically, $(C_1-C_6)$alkyl.

The acidic monomeric units may be made by known synthetic techniques, such as, for example, by grafting of one or more groups according to structure (B.I) onto a polymer backbone, such as a hydrocarbon polymer backbone, a polyester polymer backbone, or a polysaccharide polymer backbone. In the alternative, they may be made by polymerizing a monomer that comprises a reactive functional group and at least one group according to structure (B.I) per molecule.

In one embodiment the acidic monomer comprises one or more ethylenically unsaturated monocarboxylic acid monomers according to structure (B.III):

$$R^{34}-R^{32}-R^{31} \tag{B.III}$$

wherein:
$R^{31}$ and $R^{32}$ are each as described above, and
$R^{34}$ is a moiety having a site of ethylenic unsaturation.

In one embodiment, $R^{34}$ is a α-, β-unsaturated carbonyl compound. In one embodiment, $R^{34}$ is according to structure (B.IV):

(B.IV)

wherein $R^{19}$ is H or $(C_1-C_4)$alkyl.

Suitable acidic monomers include, for example, ethylenically unsaturated carboxylic acid monomers, such as acrylic acid and methacrylic acid, ethylenically unsaturated dicarboxylic acid monomers, such as maleic acid and fumaric acid, ethylenically unsaturated alkyl monoesters of dicarboxylic acid monomers, such as butyl methyl maleate, ethylenically unsaturated sulphonic acid monomers, such as vinyl sulfonic acid 2-acrylamido-2-methylpropane sulfonic acid, and styrene sulfonic acid, and ethylenically unsaturated phosphonic acid monomers, such as vinyl phosphonic acid and allyl phosphonic acid, salts of any thereof, and mixtures of any thereof. Alternatively, corresponding ethylenically unsaturated anhydride or acid chloride monomers, such as maleic anhydride, may be used and subsequently hydrolyzed to give a pendant moiety having two acid groups. The preferred acidic monomeric units are derived from one or more monomers selected from acrylic acid, methacrylic acid, and mixtures thereof. Methacrylic acid has the following formula B. V:

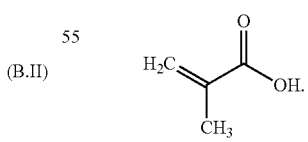

B.V

In one embodiment, the polymer of the present invention further comprises one or more nonionic monomeric units.

In one embodiment, the nonionic monomeric units each independently comprise, per monomeric unit, at least one group according to structure (C.I):

$$-R^{42}-R^{41} \tag{C.I}$$

wherein $R^{41}$ is alkyl, hydroxyalkyl, alkoxyalkyl, cycloalkyl, aryl, arylalkyl, or aryloxy, and $R^{42}$ is absent or is a bivalent linking group.

In one embodiment, $R^{41}$ is $(C_1-C_{22})$alkyl, $(C_1-C_{22})$hydroxyalkyl, $(C_2-C_{22})$alkoxyalkyl, $(C_6-C_{24})$cycloalkyl, $(C_6-C_{40})$aryl, or $(C_7-C_{40})$arylalkyl, more typically $(C_2-C_{12})$alkyl.

In one embodiment, $R^{41}$ is $(C_1-C_{22})$alkyl, more typically, $(C_1-C_{12})$alkyl.

In one embodiment, $R^{42}$ is O, —$(CH_2)_n$—O—, wherein n is an integer of from 1 to 6, or is according to structure (C.II):

(C.II)

wherein:

n is an integer of from 1 to 6,

A is O or $NR^{17}$, and $R^{17}$ is H or $(C_1-C_4)$alkyl.

The nonionic monomeric units may be made by known synthetic techniques, such as, for example, by grafting of one or more groups onto a polymer backbone, such as a hydrocarbon polymer backbone, a polyester polymer backbone, or a polysaccharide polymer backbone, or a backbone made by polymerization, with, for example, the above described acidic, and hydrophobic monomers and copolymerizable with the first, second, and third monomers. Alternatively, the nonionic monomeric units may simply be non-grafted portions of a polymer backbone.

In one embodiment, the nonionic monomeric units are derived from a nonionic monomer, for example, ethyl acrylate, that comprises a reactive functional group, and is copolymerizable with the acidic monomers and hydrophobic monomers as described herein.

In one embodiment, the reactive functional group of the nonionic monomer is an ethylenically unsaturated group and the nonionic monomer is an ethylenically unsaturated monomer comprising at least one site of ethylenic unsaturation, more typically, an α-, β-unsaturated carbonyl moiety and at least one other group.

In one embodiment, the nonionic monomer comprises one or more compounds according to structure (C.III):

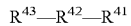

(C.III)

wherein:

$R^{41}$ and $R^{42}$ are each as described above, and $R^{43}$ is a moiety having a site of ethylenic unsaturation.

In one embodiment, the compound according to structure (C.III) is an α-, β-unsaturated carbonyl compound. In one embodiment, $R^{43}$ is according to structure (C.IV):

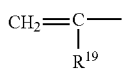

(C.IV)

wherein $R^{19}$ is H or $(C_1-C_4)$alkyl.

Suitable nonionic monomers include unsaturated monomers containing at least one group according to structure C.XXIII per molecule, including (meth)acrylic esters such as: methyl (meth)acrylate, ethyl (meth)acrylate, butyl (meth)acrylate, isobutyl (meth)acrylate, cyclohexyl (meth)acrylate, 2-ethylhexyl (meth)acrylate, isodecyl (meth)acrylate, lauryl (meth)acrylate isobornyl (meth)acrylate, benzyl (meth)acrylate, hydroxyethyl (meth)acrylate, hydroxypropyl (meth) acrylate, methoxyethyl (meth)acrylate, ethoxyethyl (meth) acrylate, phenoxyethyl (meth)acrylate, tetrahydrofurfuryl (meth)acrylate, glycidyl (meth)acrylate, dimethylaminoethyl (meth)acrylate, diethylaminoethyl (meth)acrylate, tert-butylaminoethyl (meth)acrylate, and acetoxyethyl (meth) acrylate, (meth)acrylamides such as, (meth)acrylamide, N-methylol (meth)acrylamide, N-butoxyethyl (meth)acrylamide, N,N-dimethyl (meth)acrylamide, N-isopropyl (meth) acrylamide, N-tert-butyl (meth)acrylamide, N-tert-octyl (meth)acrylamide, and diacetone (meth)acrylamide, vinyl esters such as vinyl acetate, vinyl propionate, vinyl 2-ethylhexanoate, N-vinylamides such as: N-vinylpyrrolidione, N-vinylcaprolactam, N-vinylformamide, and N-vinylacetamide, and vinyl ethers such as, methyl vinyl ether, ethyl vinyl ether, butyl vinyl ether, and hydroxybutyl vinyl ether, and ethylenically unsaturated aryl compounds, such as styrene.

In one embodiment, the HASE copolymer of the present invention is crosslinked. A crosslinked polymer can be made by, for example, reacting a mixture of hydrophobic, first acidic, and second acidic monomers with a nonionic monomer having more than one reactive functional group, such as for example, more than one site of ethylenic unsaturation per molecule. In one embodiment, the nonionic monomer comprises least one monomeric compound having more than one (meth)acrylic group per molecule, such as, for example, allyl methacrylate, ethylene glycol dimethacrylate, butylene glycol dimethacrylate, diallyl pentaerythritol, methylenebisacrylamide, pentaerythritol di-, tri- and tetra-acrylates, divinyl benzene, polyethylene glycol diacrylates, bisphenol A diacrylates, butanediol dimethacrylate, 2,2-dimethylpropanediol dimethacrylate, ethylene glycol dimethacrylate, phenylene diacrylate, or a mixture thereof.

Ethylene glycol dimethyl acrylate having the following formula

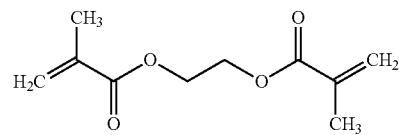

The pH responsive copolymer is made from a mixture of unsaturated copolymerizable monomers, wherein at least one is a novel monomer comprising, based on total weight of monomers:

A. about 0.1-70 weight percent, typically 0.5-50, 0.7-40, 1-40, 5-40, 5-30 or 10 to 40 weight percent, of at least one alpha beta-ethylenically unsaturated monomer according to structure (D.I). In one embodiment, the novel monomer according to the present invention comprises, based on total weight of monomers: about 0.01 to 50 weight percent (wt %), or in another embodiment 0.05 to 30 weight percent, or in another embodiment 0.5 to 10 weight percent, or in another embodiment 1 to 10 weight percent, or in another embodiment 0.5 to 9 weight percent, or in another embodiment 0.5 to 7 weight percent, or in another embodiment 4 to 10 weight percent.

In one embodiment, the $C_2-C_{30}$ branched or linear alkyl group is a $C_3-C_{30}$ branched or linear alkyl group or alkenyl group. In one embodiment, the $C_2-C_{30}$ branched or linear alkyl group or alkenyl group is a $C_4-C_{30}$ branched or linear alkyl group or alkenyl group. In one embodiment, the $C_2$-$C_{30}$ branched or linear alkyl group or alkenyl group is a $C_5$-$C_{30}$ branched or linear alkyl group or alkenyl group. In one embodiment, the $C_2$-$C_{30}$ branched or linear alkyl group or alkenyl group is a $C_6$-$C_{30}$ branched or linear alkyl group or alkenyl group. In one embodiment, the $C_2$-$C_{30}$ branched or linear alkyl group or alkenyl group is a $C_7$-$C_{30}$ branched or linear alkyl group or alkenyl group. In one embodiment, the $C_2$-$C_{30}$ branched or linear alkyl group or alkenyl group is a $C_8$-$C_{30}$ branched or linear alkyl group or alkenyl group. In one embodiment, the $C_2$-$C_{30}$ branched or linear alkyl group or alkenyl group is a $C_9$-$C_{30}$ branched or linear alkyl group or alkenyl group. In one embodiment, the $C_2$-$C_{30}$ branched or linear alkyl group or alkenyl group is a $C_{10}$-$C_{30}$ branched or linear alkyl group or alkenyl group. In one embodiment, the $C_2$-$C_{30}$ branched or linear alkyl group is a $C_9$-$C_{14}$ branched or linear alkyl group or alkenyl group. In one embodiment, the $C_2$-$C_{30}$ branched or linear alkyl group is a $C_8$-$C_{12}$ branched or linear alkyl group or alkenyl group. In one embodiment, the $C_2$-$C_{30}$ branched or linear alkyl group is a $C_{23}$-$C_{30}$ branched or linear alkyl group or alkenyl group.

In another embodiment, the $C_2$-$C_{30}$ branched or linear alkyl group or alkenyl group is a $C_2$-$C_{28}$ branched or linear alkyl group or alkenyl group. In one embodiment, the $C_2$-$C_{30}$ branched or linear alkyl group or alkenyl group is a $C_3$-$C_{26}$ branched or linear alkyl group or alkenyl group. In one embodiment, the $C_2$-$C_{30}$ branched or linear alkyl group or alkenyl group is a $C_4$-$C_{24}$ branched or linear alkyl group or alkenyl group. In one embodiment, the $C_2$-$C_{30}$ branched or linear alkyl group or alkenyl group is a $C_6$-$C_{24}$ branched or linear alkyl group or alkenyl group. In another embodiment, the $C_8$-$C_{24}$ branched or linear alkyl group or alkenyl group is a $C_{10}$-$C_{24}$ branched or linear alkyl group or alkenyl group.

In another embodiment, the $C_2$-$C_{30}$ branched or linear alkyl group or alkenyl group is a $C_6$-$C_{20}$ branched or linear alkyl group or alkenyl group. In another embodiment, the $C_2$-$C_{30}$ branched or linear alkyl group or alkenyl group is a $C_6$-$C_{18}$ branched or linear alkyl group or alkenyl group. In another embodiment, the $C_2$-$C_{30}$ branched or linear alkyl group or alkenyl group is a $C_8$-$C_{16}$ branched or linear alkyl group or alkenyl group.

In another embodiment, at least one of $R_1$, $R_2$ and $R_3$ is a branched or linear alkyl group or alkenyl group having, as a lower limit, a $C_2$ linear alkyl group, or in another embodiment, a $C_3$ branched or linear alkyl group or alkenyl group, or in another embodiment, a $C_4$ branched or linear alkyl group or alkenyl group, or in a further embodiment, a $C_5$ branched or linear alkyl group or alkenyl group, or in another embodiment, a $C_6$ branched or linear alkyl group or alkenyl group, or in yet another embodiment, a $C_7$ branched or linear alkyl group or alkenyl group, or in another embodiment, a $C_8$ branched or linear alkyl group or alkenyl group, or in another embodiment, a $C_9$ branched or linear alkyl group or alkenyl group, or in another embodiment, a $C_{10}$ branched or linear alkyl group or alkenyl group, or in another embodiment, a $C_{12}$ branched or linear alkyl group or alkenyl group, or in another embodiment, a $C_{14}$ branched or linear alkyl group or alkenyl group, or in yet a further embodiment, a $C_{16}$ branched or linear alkyl group or alkenyl group.

In one embodiment, $R_4$ and $R_8$ are independently each according to structure (D.XV):

(D.XV)

wherein $R^{19}$ is H or $(C_1$-$C_4)$alkyl.

The $C_2$-$C_{30}$ branched or linear alkyl group or alkenyl group can be a $C_3$-$C_{14}$ branched or linear alkyl group or alkenyl group, or a $C_6$-$C_{14}$ branched or linear alkyl group or alkenyl group, or a $C_8$-$C_{12}$ branched or linear alkyl group or alkenyl group, or a $C_4$-$C_{12}$ branched or linear alkyl group or alkenyl group. Preferably, The $C_2$-$C_{30}$ branched or linear alkyl group or alkenyl group can be a $C_8$-$C_{12}$ branched or linear alkyl group or alkenyl group, or a $C_4$-$C_{12}$ branched or linear alkyl group or alkenyl group.

In one embodiment, the $C_2$-$C_{30}$ branched or linear alkyl group or alkenyl group is a $C_3$-$C_{30}$ branched or linear alkyl group or alkenyl group. In one embodiment, the $C_2$-$C_{30}$ branched or linear alkyl group or alkenyl group is a $C_4$-$C_{30}$ branched or linear alkyl group or alkenyl group. In one embodiment, the $C_2$-$C_{30}$ branched or linear alkyl group or alkenyl group is a $C_5$-$C_{30}$ branched or linear alkyl group or alkenyl group. In one embodiment, the $C_2$-$C_{30}$ branched or linear alkyl group or alkenyl group is a $C_6$-$C_{30}$ branched or linear alkyl group or alkenyl group. In one embodiment, the $C_2$-$C_{30}$ branched or linear alkyl group or alkenyl group is a $C_7$-$C_{30}$ branched or linear alkyl group or alkenyl group. In one embodiment, the $C_2$-$C_{30}$ branched or linear alkyl group or alkenyl group is a $C_8$-$C_{30}$ branched or linear alkyl group or alkenyl group. In one embodiment, the $C_2$-$C_{30}$ branched or linear alkyl group or alkenyl group is a $C_9$-$C_{30}$ branched or linear alkyl group or alkenyl group. In one embodiment, the $C_2$-$C_{30}$ branched or linear alkyl group or alkenyl group is a $C_{10}$-$C_{30}$ branched or linear alkyl group or alkenyl group.

In another embodiment, the $C_2$-$C_{30}$ branched or linear alkyl group or alkenyl group is a $C_2$-$C_{28}$ branched or linear alkyl group or alkenyl group. In one embodiment, the $C_2$-$C_{30}$ branched or linear alkyl group or alkenyl group is a $C_3$-$C_{26}$ branched or linear alkyl group or alkenyl group. In one embodiment, the $C_2$-$C_{30}$ branched or linear alkyl group or alkenyl group is a $C_4$-$C_{24}$ branched or linear alkyl group or alkenyl group. In one embodiment, the $C_2$-$C_{30}$ branched or linear alkyl group or alkenyl group is a $C_6$-$C_{24}$ branched or linear alkyl group or alkenyl group. In another embodiment, the $C_8$-$C_{24}$ branched or linear alkyl group or alkenyl group is a $C_{10}$-$C_{24}$ branched or linear alkyl group or alkenyl group.

In another embodiment, the $C_2$-$C_{30}$ branched or linear alkyl group or alkenyl group is a $C_6$-$C_{20}$ branched or linear alkyl group or alkenyl group. In another embodiment, the $C_2$-$C_{30}$ branched or linear alkyl group or alkenyl group is a $C_6$-$C_{18}$ branched or linear alkyl group or alkenyl group. In another embodiment, the $C_2$-$C_{30}$ branched or linear alkyl group or alkenyl group is a $C_8$-$C_{16}$ branched or linear alkyl group or alkenyl group.

In one embodiment, $R_1$, $R_3$, $R_5$, $R_7$ are each independently O, a bivalent hydrocarbon group, even more typically a methylene group or chain of from 2 to 6 methylene units, or a bivalent alkyleneoxyl group, such as ethyleneoxy. In one embodiment, $R_1$, $R_3$, $R_5$, $R_7$ are independently according to structure (D.VIII):

wherein A is O or absent, and b is an integer of from 1 to 6.

In some embodiments, $R_2$ and $R_6$ are independently a bivalent polyether group comprising a linear chain of from 2 to 100 units, each of which may independently be ($C_2$-$C_4$)oxyalkylene, more typically, ($C_2$-$C_3$)oxyalkylene. In one embodiment, $R_2$ and $R_6$ are independently a bivalent polyether group comprising a chain of from 2 to 100 polymerized oxyethylene units and oxypropylene units, which may be arranged alternately, randomly, or in blocks. In one embodiment, $R_2$ and $R_6$ are independently a bivalent polyether group comprising a block of polyoxyethylene units and a block of oxypropylene units, more typically, a block of polyoxyethylene units and a block of oxypropylene units, wherein the block of oxypropylene units is disposed between and links the block of oxyethylene units and the $R^{12}$ substituent, if present, or the $R^{11}$ substituent, if $R^{12}$ is not present.

In one embodiment, $R_1$, $R_3$, $R_5$, $R_7$ are each independently —$(CH_2)_xO$—, wherein x is an integer from 1 to 20 (e.g., use of styrenated benzyl alcohols)

In another embodiment, $R_1$, $R_3$, $R_5$, $R_7$ are each independently —$CH_2CH(OH)CH_2O$— or —$CH_2CH(CH_2OH)O$— (e.g., use of epichlorohydrin as coupling agent)

In one embodiment, $R_2$ and $R_6$ are independently:
—$[CH(R_{20})CH(R_{21})O]_x$— wherein x is an integer of from 0 to 100, and $R_{20}$ and $R_{21}$ are independently selected from any of the following:
H; —$CH_2OH$; phenyl; —$CH_2Cl$;
a $C_1$-$C_{30}$ straight or branched alkyl or alkenyl;
—$CH_2OR_{22}$ wherein $R_{22}$ is $C_1$-$C_{30}$ straight or branched alkyl or alkenyl, phenyl, or alkyl substituted phenyl; or
R'COOCH$_2$— where R' is $C_1$-$C_{30}$ straight or branched alkyl or alkenyl.

The hydrophobic monomeric units may be made by known synthetic techniques, such as, for example, by grafting of one or more groups according to structure (D.I) onto a polymer backbone, such as a hydrocarbon polymer backbone, a polyester polymer backbone, or a polysaccharide polymer backbone, or by copolymerization, with, for example, the acidic monomer and nonionic monomer described above, of at least one other monomer selected from monomers that comprise a reactive functional group and at least one group according to structure (D.I) per molecule.

In one embodiment, the hydrophobic monomeric units are derived from at least one hydrophobic monomer selected from monomers that comprise a reactive functional group and at least one group according to structure (D.I) per molecule.

In one embodiment, the reactive functional group of the first monomer is an ethylenically unsaturated group. Thus, the hydrophobic monomer is selected from ethylenically unsaturated monomers that comprise at least one site of ethylenic unsaturation, more typically, an α-, β-unsaturated carbonyl moiety, and least one group according to structure (I) per molecule.

Making the ASE and/or HASE Copolymer

The pH responsive copolymer is the product of copolymerization of a mixture of monomers, comprising:

A. about 0-60 weight percent, preferably 5 to 30 weight percent, of at least one C3-C8 alpha beta-ethylenically unsaturated acidic monomer, preferably a C3-C8 alpha beta-ethylenically unsaturated carboxylic acid monomer;

B. about 15-70 weight percent, typically 20 to 50 weight percent, of at least one non-ionic, copolymerizable C2-C12 alpha, beta-ethylenically unsaturated monomer.

C. about 0.01 to 30 weight percent, preferably 0.05 to 30 weight percent or typically 5 to 20 weight percent, of at least one non-ionic ethylenically unsaturated hydrophobic monomer.

The pH responsive copolymer of the present invention can be conveniently prepared from the above-described monomers by known aqueous emulsion polymerization techniques using free-radical producing initiators, typically in an amount from 0.01 percent to 3 percent, based on the weight of the monomers.

In one embodiment, the polymerization is conducted at a pH of about 5.0 or less. Polymerization at an acid pH of about 5.0 or less permits direct preparation of an aqueous colloidal dispersion having relatively high solids content without the problem of excessive viscosity.

In one embodiment, the polymerization is conducted in the presence of one or more free-radical producing initiators selected from peroxygen compounds. Useful peroxygen compounds include inorganic persulfate compounds such as ammonium persulfate, potassium persulfate, sodium persulfate, peroxides such as hydrogen peroxide, organic hydroperoxides, for example, cumene hydroperoxide, and t-butyl hydroperoxide, organic peroxides, for example, benzoyl peroxide, acetyl peroxide, lauroyl peroxide, peracetic acid, and perbenzoic acid (sometimes activated by a water-soluble reducing agent such as ferrous compound or sodium bisulfite), and other free-radical producing materials or techniques such as 2,2'-azobisisobutyronitrile and high energy radiation sources.

In one embodiment, the polymerization is conducted in the presence of one or more emulsifiers. Useful emulsifiers include anionic surfactants, nonionic surfactants, amphoteric surfactants, and zwitterionic surfactants. In one embodiment, the emulsion polymerization is conducted in the presence of one or more anionic surfactants. Examples of anionic emulsifiers are the alkali metal alkyl aryl sulfonates, the alkali metal alkyl sulfates and the sulfonated alkyl esters. Specific examples of these well-known emulsifiers are sodium dodecyl benzene sulfonate, sodium dodecyl butylnaphthalene sulfonate, sodium lauryl sulfate, disodium dodecyl diphenyl ether disulfonate, disodium n-octadecyl sulfosuccinamate and sodium dioctyl sulfosuccinate. Known nonionic emulsifiers include, for example, fatty alcohols, alkoxylated fatty alcohols, and alkylpolyglucosides.

The emulsion polymerization may, optionally, be conducted in the presence, in an amount up to about 10 parts per 100 parts of polymerizable monomers, of one or more chain transfer agents. Representative chain transfer agents are carbon tetrachloride, bromoform, bromotrichloromethane, and long-chain alkyl mercaptans and thioesters, such as n-dodecyl mercaptan, t-dodecyl mercaptan, octyl mercaptan, tetradecyl mercaptan, hexadecyl mercaptan, butyl thioglycolate, isooctyl thioglycolate, and dodecyl thioglycolate.

Optionally, other ingredients well known in the emulsion polymerization art may be included, such as chelating agents, buffering agents, inorganic salts and pH adjusting agents.

In one embodiment, the polymerization is carried out at a temperature between about 60° C. and 90° C., but higher or lower temperatures may be used. The polymerization can be conducted batchwise, stepwise, or continuously with batch and/or continuous addition of the monomers, in a conventional manner.

The monomers can be copolymerized in such proportions, and the resulting emulsion polymers can be physically blended, to give products with the desired balance of properties for specific applications. For example, for analogous polymers of a given molecular weight, increasing the amount of first monomer tends to increase the yield strength exhibited by the polymer, increasing the relative amount of second monomer tends to increase the viscosity of the polymer. One or more fourth monomers may be added to adjust the properties of the polymer.

These polymeric products prepared by emulsion polymerization at an acid pH are in the form of stable aqueous colloidal dispersions containing the polymer dispersed as discrete particles having average particle diameters of about 400 to about 3000 Å (40 to 300 nanometers) and preferably about 600 to about 1750 Å (60 to 175 nanometers), as measured by light scattering. Dispersions containing polymer particles smaller than about 400 Å (40 nanometers) are difficult to stabilize, while particles larger than about 3000 Å (300 nanometers) reduce the ease of dispersion in the aqueous products to be thickened.

In one embodiment, the polymer composition is in the form of an aqueous polymer dispersion, typically having a solids content including the polymer and any surfactants that may be present and based on the total weight of the polymer dispersion, of up to about 60 wt % and, more typically about 20 to about 50 wt %.

Alternatively this (co)polymerization may also be conducted by different methods or in different solvents. The scope of methods and solvents is well known to those skilled in the art.

Thus, these polymers for use in the present invention can be made using known solution polymerization techniques, wherein the reactant monomers and initiator are dissolved in an appropriate solvent such as toluene, xylene, tetrahydrofuran, or mixtures thereof. Polymerization can be accomplished in the time and at the temperature necessary, e.g., 60° C. to 80° C. and about 2 to 24 hours. The polymer product can be isolated through normal separation techniques, including solvent stripping.

In one embodiment, these polymers for use in the present invention exhibit a weight average molecular weight, as determined by gel permeation chromatography and light scattering of a solution of the polymer in tetrahydrofuran and compared to a polystyrene standard, of greater than or equal to 30,000 grams per mole ("g/mole"). HASE thickeners may not fully dissolve in THF but after hydrolysis they can dissolve in water and measurement can be run in a water gel permeation chromatography (GPC). Reference: Macromolecules 2000, 33, 2480. For example in a range of 30,000 to 5,000,000 g/mole. More typically the polymer of the present invention exhibits a weight average molecular weight of from about 100,000 g/mole, and even more typically from about 150,000 g/mole, to about 1,500,000 g/mole, more typically to about 1,000,000 g/mole, and even more typically to about 800,000 g/mole.

In one embodiment, these pH responsive copolymers for use in the present invention are in the form of an aqueous colloidal polymer dispersion. When the polymer composition is in the form of an aqueous colloidal polymer dispersion, the composition is maintained at a pH of about 5 or less to maintain stability. More typically, the aqueous colloidal polymer dispersion composition has a pH of about 1.5 to about 3. When thickening of the composition is desired, the pH of the composition can be increased to a value above about 5 by addition of a base to solubilize the polymer.

These ASE and HASE copolymers and compositions for use as thickeners in the present invention are pH-responsive. At the lower pH levels at which the emulsion polymerization takes place, i.e., pH levels of 5 or less, the composition is relatively thin or non-viscous. When the pH of the copolymer dispersion is neutralized or adjusted by addition of a base to a pH of about 5.5 or more, preferably about 6 to about 11, the composition thickens substantially. The composition turns from semi-opaque or opaque to translucent or transparent as viscosity increases. Viscosity increases as copolymer dissolves partially or completely in the aqueous phase of the composition. Neutralization can occur in situ when the emulsion copolymer is blended with the base and added to the aqueous phase. Or, if desired for a given application, neutralization can be carried out when blending with an aqueous product. Useful bases include, but are not limited to, ammonium hydroxide, an amine, sodium hydroxide, potassium carbonate or the like.

For example, the HASE copolymer having a polymer backbone including MAA and EA is a pH-sensitive thickener. Typically the copolymer is a latex at pH=2.3. When neutralized with a suitable base to a pH above about 5.5, the carboxyl groups on the methacrylic acid ionize to carboxylate ions. The charge on the polymer induces a conformational change, and the white latex becomes water-soluble, thus increasing the hydrodynamic volume of the polymer. When the HASE copolymers swell, the pendant hydrophobic groups are free to build associations with one another and with other hydrophobes available in the formulation, such as surfactants, particulates, emulsion droplets and dyes. This phenomenon creates a network structure that results in a significant viscosity build.

IV. Uses of the pH Responsive Polymer

The polymers and polymer compositions according to the present invention are useful as water-soluble thickeners for a wide variety of applications ranging from home care, personal care and oilfield drilling fluids. They are particularly useful for aqueous paints and coatings. Solution-polymerized polymers can be used in solvent systems or emulsified by known techniques for use in aqueous systems. Other uses include latexes and detergents. Useful cosmetic compositions will typically have an aqueous carrier, a pigment and/or cosmetic active, a HASE emulsion polymer, and optional adjuvants. Useful detergents and cleansers will typically have aqueous carrier, a HASE emulsion polymer, and optional adjuvants. Oilfield drilling fluids will typically have an aqueous carrier, HASE emulsion polymer as a thickener/viscosity modifier, and optional adjuvants. The oilfield drilling fluids are injected into the oilfield formation. Useful latex coatings will typically have an aqueous carrier, a HASE emulsion polymer, and optional adjuvants.

The HASE emulsion polymers according to the present invention as described herein are particularly useful as thickeners for a wide variety of water-based compositions. Such compositions include brine, slurries, and colloidal dispersions of water-insoluble inorganic and organic materials, such as natural rubber, synthetic or artificial latexes. The emulsion polymers of the invention are especially useful in areas requiring thickening at neutral pHs, such as in cosmetics.

In one embodiment, the aqueous composition comprising the pH responsive polymer of the present invention exhibits viscoelastic properties at neutral to alkaline pH values, typically at pH values greater than or equal to about 5, more typically greater than or equal to about 5.5, even more typically from about 6 to about 9.

IV. Use of the pH Responsive Polymer with Binders which are Latex Polymers

Embodiments of the invention, such as latex paint, may contain more than one category of latex. There can be a first latex namely, the HASE copolymer, as a thickener. There can also be a second latex, for example RHOPLEX SG30 or REVACRYL synthetic latex emulsion resins, as a binder for latex paint.

Synthetic latexes take the form of aqueous dispersions/suspensions of particles of latex polymers. Synthetic latexes include aqueous colloidal dispersions of water-insoluble polymers prepared by emulsion polymerization of one or more ethylenically unsaturated monomers. Typical of such synthetic latexes are emulsion copolymers of monoethylenically unsaturated compounds, such as styrene, methyl methacrylate, acrylonitrile with a conjugated diolefin, such as butadiene or isoprene; copolymers of styrene, acrylic and methacrylic esters, copolymers of vinyl halide, vinylidene halide, vinyl acetate and the like. Many other ethylenically unsaturated monomers or combinations thereof can be emulsion polymerized to form synthetic latexes. Such latexes are commonly employed in paints (latex paints) and coatings. The composition of the present invention may be added to latexes to modify/increase viscosity.

The polymeric thickeners of this invention are advantageous for use with the water-based compositions according to the foregoing description and with compositions containing those materials, especially coating compositions of various types. Mixtures or combinations of two or more thickeners may be used, if desired. Of course the latex polymers used in coating compositions are preferably film-forming at temperatures about 25 degrees C. or less, either inherently or through the use of plasticizers. Such coating compositions include water-based consumer and industrial paints; sizing, adhesives and other coatings for paper, paperboard, textiles; and the like.

Latex paints and coatings may contain various adjuvants, such as pigments, fillers and extenders. Useful pigments include, but are not limited to, titanium dioxide, mica, and iron oxides. Useful fillers and extenders include, but are not limited to, barium sulfate, calcium carbonate, clays, talc, and silica. The compositions of the present invention described herein are compatible with most latex paint systems and provide highly effective and efficient thickening.

The polymer compositions of the present invention may be added to aqueous product systems at a wide range of amounts depending on the desired system properties and end use applications. In latex paints, the composition is added such that the emulsion (HASE) polymer according to the present invention is present at about 0.05 to about 5.0 weight percent and preferably about 0.1 to about 3.0 weight percent based on total weight of the latex paint, including all of its components, such as water, HASE polymer, latex polymer, pigment, and any adjuvants.

The present invention also includes a method of preparing an aqueous coating composition by mixing together at least one latex polymer derived from at least one monomer and blended with at least one pH responsive copolymer as described above, and at least one pigment. Preferably, the latex polymer is in the form of latex polymer dispersion. The additives discussed above can be added in any suitable order to the latex polymer, the pigment, or combinations thereof, to provide these additives in the aqueous coating composition. In the case of paint formulations, the aqueous coating composition preferably has a pH of from 7 to 10.

In formulating latexes and latex paints/coatings, physical properties that may be considered include, but are not limited to, viscosity versus shear rate, ease of application to surface, spreadability, and shear thinning.

V. Emulsion Polymerization to Make Latex Binder for Latex Paint

Emulsion polymerization is discussed in G. Pohlein, "Emulsion Polymerization", Encyclopedia of Polymer Science and Engineering, vol. 6, pp. 1-51 (John Wiley & Sons, Inc., NY, NY, 1986), the disclosure of which is incorporated herein by reference. Emulsion polymerization is a heterogeneous reaction process in which unsaturated monomers or monomer solutions are dispersed in a continuous phase with the aid of an emulsifier system and polymerized with free-radical or redox initiators. The product, a colloidal dispersion of the polymer or polymer solution, is called a latex.

The monomers typically employed in emulsion polymerization to make latex for latex paint include such monomers as methyl acrylate, ethyl acrylate, methyl methacrylate, butyl acrylate, 2-ethyl hexyl acrylate, other acrylates, methacrylates and their blends, acrylic acid, methacrylic acid, styrene, vinyl toluene, vinyl acetate, vinyl esters of higher carboxylic acids than acetic acid, e.g. vinyl versatate, acrylonitrile, acrylamide, butadiene, ethylene, vinyl chloride and the like, and mixtures thereof. This is further discussed below in the section entitled "Latex Monomers".

In the above process, suitable initiators, reducing agents, catalysts and surfactants are well known in the art of emulsion polymerization. Typical initiators include ammonium persulfate (APS), hydrogen peroxide, sodium, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like. Commonly used redox initiation systems are described e.g., by A. S. Sarac in Progress in Polymer Science 24(1999), 1149-1204.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Suitable catalysts are those compounds which increase the rate of polymerization and which, in combination with the above-described reducing agents, promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

Emulsion polymerization occurs in the presence of an emulsifier. Typically the mixture contains 0.5 to 6 wt % emulsifier based on weight of latex monomers Typical emulsifiers are ionic or non-ionic surfactants polymerizable or non-polymerizable in the aqueous coating composition including latex polymer. Suitable ionic and nonionic surfactants are alkyl polyglycol ethers such as ethoxylation products of lauryl, tridecyl, oleyl, and stearyl alcohols; alkyl phenol polyglycol ethers such as ethoxylation products of octyl- or nonylphenol, diisopropyl phenol, triisopropyl phenol; alkali metal or ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tritertiary-butyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

The polymer latex binder can be produced by first preparing an initiator solution comprising the initiator and water. A monomer pre-emulsion is also prepared comprising one or more surfactants (emulsifiers), and other latex monomers to be used to form the latex polymer, water, and additional additives such as NaOH.

Thus, a typical process of emulsion polymerization preferably involves charging water to a reactor and feeding as separate streams a pre-emulsion of the monomer and a solution of the initiator. In particular, the polymer latex binder can be prepared using emulsion polymerization by feeding the monomers used to form the latex binder to a reactor in the presence of at least one initiator and at least one surfactant and polymerizing the monomers to produce the latex binder. Typically the initiator solution and monomer pre-emulsion are continuously added to the reactor over a predetermined period of time (e.g. 1.5-5 hours) to cause polymerization of latex monomers to produce the latex polymer.

Prior to the addition of the initiator solution and the monomer pre-emulsion, a seed latex such as a polystyrene seed latex can be added to the reactor. For example, a small amount of the pre-emulsion and a portion of the initiator may be charged initially at the reaction temperature to produce "seed" latex. The "seed" latex procedure results in better particle-size reproducibility.

Under "normal" initiation conditions, that is initiation conditions under which the initiator is activated by heat, the polymerization is normally carried out at about 60-90° C. A typical "normal" initiated process, for example, could employ ammonium persulfate as initiator at a reaction temperature of 80+/–2° C. Under "redox" initiation conditions, namely initiation conditions under which the initiator is activated by a reducing agent, the polymerization is normally carried out at 60-70° C. Normally, the reducing agent is added as a separate solution. A typical "redox" initiated process, for example, could employ potassium persulfate as the initiator and sodium metabisulfite as the reducing agent at a reaction temperature of 65+/–2° C.

The reactor is operated at desired reaction temperature at least until all the monomers are fed to produce the polymer latex binder. Once the polymer latex binder is prepared, it is preferably chemically stripped thereby decreasing its residual monomer content. Preferably, it is chemically stripped by continuously adding an oxidant such as a peroxide (e.g. t-butylhydroperoxide) and a reducing agent (e.g. sodium acetone bisulfite), or another redox pair such as those described by A. S. Sarac in Progress in Polymer Science 24(1999), 1149-1204, to the latex binder at an elevated temperature and for a predetermined period of time (e.g. 0.5 hours). The pH of the latex binder can then be adjusted and other additives added after the chemical stripping step.

In the above emulsions, the polymer preferably exists as a generally spherical particle, dispersed in water, with a diameter of about 50 nanometers to about 500 nanometers.

For purposes of this description, monomers from which latex polymers may be derived are termed "latex monomers".

The latex monomers fed to a reactor to prepare the polymer latex binder preferably include at least one acrylic monomer selected from the group consisting of acrylic acid, acrylic acid esters, methacrylic acid, and methacrylic acid esters. In addition, the monomers can include styrene, vinyl acetate, or ethylene. The monomers can also include one or more monomers selected from the group consisting of styrene, (alpha)-methyl styrene, vinyl chloride, acrylonitrile, methacrylonitrile, ureido methacrylate, vinyl acetate, vinyl esters of branched tertiary monocarboxylic acids (e.g. vinyl esters commercially available under the mark VEOVA from Shell Chemical Company or sold as EXXAR neo vinyl esters by ExxonMobil Chemical Company), itaconic acid, crotonic acid, maleic acid, fumaric acid, and ethylene. It is also possible to include C4-C8 conjugated dienes such as 1,3-butadiene, isoprene or chloroprene. Commonly used monomers in making acrylic paints are butyl acrylate, methyl methacrylate, ethyl acrylate and the like. Preferably, the monomers include one or more monomers selected from the group consisting of n-butyl acrylate, methyl methacrylate, styrene and 2-ethylhexyl acrylate.

The latex polymer is typically selected from the group consisting of pure acrylics (comprising acrylic acid, methacrylic acid, an acrylate ester, and/or a methacrylate ester as the main monomers); styrene acrylics (comprising styrene and acrylic acid, methacrylic acid, an acrylate ester, and/or a methacrylate ester as the main monomers); vinyl acrylics (comprising vinyl acetate and acrylic acid, methacrylic acid, an acrylate ester, and/or a methacrylate ester as the main monomers); and acrylated ethylene vinyl acetate copolymers (comprising ethylene, vinyl acetate and acrylic acid, methacrylic acid, an acrylate ester, and/or a methacrylate ester as the main monomers). The monomers can also include other main monomers such as acrylamide and acrylonitrile, and one or more functional monomers such as itaconic acid and ureido methacrylate, as would be readily understood by those skilled in the art. In a particularly preferred embodiment, the latex polymer is a pure acrylic such as a butyl acrylate/methyl methacrylate copolymer derived from monomers including butyl acrylate and methyl methacrylate.

In typical acrylic paint compositions the polymer is comprised of one or more esters of acrylic or methacrylic acid, typically a mixture, e.g. about 50/50 by weight, of a high $T_g$ monomer (e.g. methyl methacrylate) and a low $T_g$ monomer (e.g. butyl acrylate), with small proportions, e.g. about 0.5% to about 2% by weight, of acrylic or methacrylic acid. The vinyl-acrylic paints usually include vinyl acetate and butyl acrylate and/or 2-ethyl hexyl acrylate and/or vinyl versatate. In vinyl-acrylic paint compositions, at least 50% of the polymer formed is comprised of vinyl acetate, with the remainder being selected from the esters of acrylic or methacrylic acid. The styrene/acrylic polymers are typically similar to the acrylic polymers, with styrene substituted for all or a portion of the methacrylate monomer thereof.

The latex polymer dispersion preferably includes from about 30 to about 75% solids and a mean latex particle size of from about 70 to about 650 nm. The latex polymer is preferably present in the aqueous coating composition in an amount from about 5 to about 60 percent by weight, and more preferably from about 8 to about 40 percent by weight (i.e. the weight percentage of the dry latex polymer based on the total weight of the coating composition).

The aqueous coating composition is a stable fluid that can be applied to a wide variety of materials such as, for example, paper, wood, concrete, metal, glass, ceramics, plastics, plaster, and roofing substrates such as asphaltic coatings, roofing felts, foamed polyurethane insulation; or to previously painted, primed, undercoated, worn, or weathered substrates. The aqueous coating composition of the invention can be applied to the materials by a variety of techniques well known in the art such as, for example, brush, rollers, mops, air-assisted or airless spray, electrostatic spray, and the like.

V. Liquid Carrier

In one embodiment, the composition of the present invention comprises the selected polymer and a liquid carrier.

In one embodiment, the liquid carrier is an aqueous carrier comprising water and the treatment solution is in the form of a solution, emulsion, or dispersion of the material and additives. In one embodiment, the liquid carrier comprises water and a water miscible organic liquid. Suitable water miscible organic liquids include saturated or unsaturated monohydric alcohols and polyhydric alcohols, such as, for example, methanol, ethanol, isopropanol, cetyl alcohol, benzyl alcohol, oleyl alcohol, 2-butoxyethanol, and ethylene glycol, as well as alkylether diols, such as, for example, ethylene glycol monoethyl ether, propylene glycol monoethyl ether and diethylene glycol monomethyl ether.

As used herein, terms "aqueous medium" and "aqueous media" are used herein to refer to any liquid medium of which water is a major component. Thus, the term includes water per se as well as aqueous solutions and dispersions.

VI. Other Additives

As described above, latex paints and coatings may contain various adjuvants.

The aqueous coating compositions of the invention include less than 2% by weight and preferably less than 1.0% by weight of anti-freeze agents based on the total weight of the aqueous coating composition. For example, the aqueous coating compositions may be substantially free of anti-freeze agents.

The aqueous coating composition typically includes at least one pigment. The term "pigment" as used herein includes non-film-forming solids such as pigments, extenders, and fillers. The at least one pigment is preferably selected from the group consisting of TiO2 (in both anastase and rutile forms), clay (aluminum silicate), CaCO3 (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Suitable mixtures include blends of metal oxides such as those sold under the marks MINEX (oxides of silicon, aluminum, sodium and potassium commercially available from Unimin Specialty Minerals), CELITES (aluminum oxide and silicon dioxide commercially available from Celite Company), ATOMITES (commercially available from English China Clay International), and ATTAGELS (commercially available from Engelhard). More preferably, the at least one pigment includes TiO2, CaCO3 or clay. Generally, the mean particle sizes of the pigments range from about 0.01 to about 50 microns. For example, the TiO2 particles used in the aqueous coating composition typically have a mean particle size of from about 0.15 to about 0.40 microns. The pigment can be added to the aqueous coating composition as a powder or in slurry form. The pigment is preferably present in the aqueous coating composition in an amount from about 5 to about 50 percent by weight, more preferably from about 10 to about 40 percent by weight.

The coating composition can optionally contain additives such as one or more film-forming aids or coalescing agents. Suitable firm-forming aids or coalescing agents include plasticizers and drying retarders such as high boiling point polar solvents. Other conventional coating additives such as, for example, dispersants, additional surfactants (i.e. wetting agents), rheology modifiers, defoamers, thickeners, additional biocides, additional mildewcides, colorants such as colored pigments and dyes, waxes, perfumes, co-solvents, and the like, can also be used in accordance with the invention. For example, non-ionic and/or ionic (e.g. anionic or cationic) surfactants can be used to produce the polymer latex. These additives are typically present in the aqueous coating composition in an amount from 0 to about 15% by weight, more preferably from about 1 to about 10% by weight based on the total weight of the coating composition.

The aqueous coating composition typically includes less than 10.0% of anti-freeze agents based on the total weight of the aqueous coating composition. Exemplary anti-freeze agents include ethylene glycol, diethylene glycol, propylene glycol, glycerol (1,2,3-trihydroxypropane), ethanol, methanol, 1-methoxy-2-propanol, 2-amino-2-methyl-1-propanol, and FTS-365 (a freeze-thaw stabilizer from Inovachem Specialty Chemicals). More preferably, the aqueous coating composition includes less than 5.0% or is substantially free (e.g. includes less than 0.1%) of anti-freeze agents. Accordingly, the aqueous coating composition of the invention preferably has a VOC level of less than about 100 g/L and more preferably less than or equal to about 50 g/L.

The balance of the aqueous coating composition of the invention is water. Although much of the water is present in the polymer latex dispersion and in other components of the aqueous coating composition, water is generally also added separately to the aqueous coating composition. Typically, the aqueous coating composition includes from about 10% to about 85% by weight and more preferably from about 35% to about 80% by weight water. Stated differently, the total solids content of the aqueous coating composition is typically from about 15% to about 90%, more preferably, from about 20% to about 65%.

The coating compositions are typically formulated such that the dried coatings comprise at least 10% by volume of dry polymer solids, and additionally 5 to 90% by volume of non-polymeric solids in the form of pigments. The dried coatings can also include additives such as plasticizers, dispersants, surfactants, rheology modifiers, defoamers, thickeners, additional biocides, additional mildewcides, colorants, waxes, and the like, that do not evaporate upon drying of the coating composition.

In one embodiment, the present invention is directed to a home care or industrial cleaning composition, such as a liquid detergent, a laundry detergent, a hard surface cleanser, a dish wash liquid, or a toilet bowl cleaner, comprising water, one or more surfactants, and a polymer of the present invention. Suitable surfactants include those described above in regard to the personal care composition embodiments of the present invention. Such cleaning compositions may optionally further comprise one or more of water miscible organic solvents, such as alcohols and glycols, and/or one or more additives.

Suitable additives are known in the art and include, for example, organic builders, such as organophosphonates, inorganic builders, such as ammonium polyphosphates, alkali metal pyrophosphates, zeolites, silicates, alkali metal borates, and alkali metal carbonates, bleaching agents, such as perborates, percarbonates, and hypochlorates, sequestering agents and anti-scale agents, such as citric acid and ethylenediaminetetraacetic acid, inorganic acids, such as phosphoric acid and hydrochloric acid, organic acids, such as acetic acid, abrasives, such as silica or calcium carbonate, antibacterial agents or disinfectants, such as triclosan and cationic biocides, for example (N-alkyl)benzyldimethylammonium chlorides, fungicides, enzymes, opacifing agents, pH modifiers, dyes, fragrances, and preservatives.

In an embodiment the home care or industrial cleaner benefit agent is selected from the group consisting of soil release agents, fabric softener, surfactants, builders, binders, bleach and fragrances.

In an embodiment the home care or industrial cleaning composition for cleaning fabrics or hard surfaces comprising, the composition of the present invention and a surfactant and a home care or industrial cleaner benefit agent.

In an embodiment the composition is a detergent composition and comprises: the polymer, at least one detersive surfactant, and a builder.

The invention also encompasses a method for cleaning a substrate selected from the group consisting of a hard surface and a fabric, comprising applying the composition of the present invention to the substrate.

It should be apparent embodiments other than those expressly described above come within the spirit and scope of the present invention. Thus, the present invention is not defined by the above description but by the claims appended hereto.

What is claimed is:

1. An ethylenically unsaturated monomer according to structure (D.I):

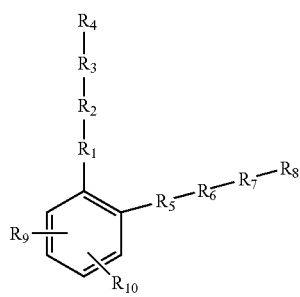

(D.I)

wherein
$R_1$ and $R_5$ are independently absent or a bivalent linking group,
$R_2$ and $R_6$ are independently a bivalent polyether group,
$R_3$ and $R_7$ are independently absent or a bivalent linking group, and
$R_4$ and $R_8$ are independently a moiety having a site of ethylenic unsaturation;
wherein $R_9$ and $R_{10}$ are independently selected from the following structures D.Ia, D.Ib, D.Ic, D.Id:

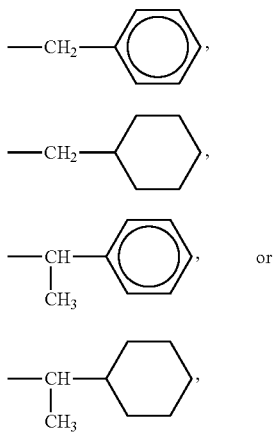

or a $C_2$-$C_{30}$ branched or linear alkyl group or alkenyl group.

2. The monomer of claim 1 wherein $R_2$ and $R_6$ are independently selected from —[CH($R_{20}$)CH($R_{21}$)O]$_x$—, wherein x is an integer of from 0 to 100, and $R_{20}$ and $R_{21}$ are independently selected from any of the following:
H; —CH$_2$OH; phenyl; —CH$_2$Cl;
a $C_1$-$C_{30}$ straight or branched alkyl or alkenyl;
—CH$_2$O$R_{22}$ wherein $R_{22}$ is $C_1$-$C_{30}$ straight or branched alkyl or alkenyl, phenyl, or alkyl substituted phenyl; or R'COOCH$_2$— where R' is $C_1$-$C_{30}$ straight or branched alkyl or alkenyl.

3. The monomer of claim 1 wherein $R_4$ and $R_8$ are independently according to structure (D.XV):

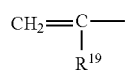

(D.XV)

wherein $R^{19}$ is H or ($C_1$-$C_4$)alkyl.

4. The monomer of claim 1 wherein the $C_2$-$C_{30}$ branched or linear alkyl group or alkenyl group is a $C_3$-$C_{14}$ branched or linear alkyl group.

5. The monomer of claim 1 wherein the $C_2$-$C_{30}$ branched or linear alkyl group or alkenyl group is a $C_9$-$C_{30}$ branched or linear alkenyl group.

6. The monomer of claim 1 wherein the $C_2$-$C_{30}$ branched or linear alkyl group or alkenyl group is a $C_6$-$C_{14}$ branched or linear alkyl group.

7. The monomer of claim 1 wherein the $C_2$-$C_{30}$ branched or linear alkyl group or alkenyl group is a $C_9$-$C_{14}$ branched or linear alkenyl group.

8. The monomer of claim 1 wherein the $C_2$-$C_{30}$ branched or linear alkyl group or alkenyl group is a $C_8$-$C_{12}$ branched or linear alkyl group.

9. The monomer of claim 1 wherein the $C_2$-$C_{30}$ branched or linear alkyl group or alkenyl group is a $C_{23}$-$C_{30}$ branched or linear alkenyl group.

10. The monomer of claim 1 wherein the $C_2$-$C_{30}$ branched or linear alkyl group or alkenyl group is a $C_4$-$C_{12}$ branched or linear alkyl group or alkenyl group.

11. A copolymer of unsaturated copolymerizable monomers, said unsaturated copolymerizable monomers comprising, based on total weight of monomers:
   A. about 0-60 weight percent of at least one $C_3$-$C_8$ alpha beta-ethylenically unsaturated acidic monomer;
   B. about 15-70 weight percent of at least one nonionic, copolymerizable $C_2$-$C_{12}$ alpha, beta-ethylenically unsaturated monomer; and
   C. about 0.05 to 30 weight percent of at least one ethylenically unsaturated monomer according to claim 1 wherein the ethylenically unsaturated monomer is nonionic and hydrophobic.

12. The copolymer of claim 11, wherein the copolymer is pH responsive.

13. The copolymer of claim 11, comprising, based on total weight of monomers:
   A. about 5 to 60 weight percent of the at least one $C_3$-$C_8$ alpha beta-ethylenically unsaturated acidic monomer;
   B. about 15-70 weight percent of the at least one nonionic, copolymerizable $C_2$-$C_{12}$ alpha, beta-ethylenically unsaturated monomer; and
   C. about 0.05 to 30 weight percent of at least one ethylenically unsaturated monomer according to claim 1 wherein the ethylenically unsaturated monomer is nonionic and hydrophobic.

14. The copolymer of claim 13, wherein the at least one $C_3$-$C_8$ alpha beta-ethylenically unsaturated acidic monomer (A) is present from about 25 weight percent to about 60 weight percent based on total monomer weight.

15. The copolymer of claim 13 wherein the at least one $C_3$-$C_8$ alpha beta-ethylenically unsaturated acidic monomer (A) is selected from a group consisting of methacrylic acid, acrylic acid and a combination thereof.

16. The copolymer of claim 13 wherein the nonionic monomer (B) is alkyl acrylate.

17. An aqueous composition, comprising water and the pH responsive copolymer of claim 12.

18. A method for thickening an aqueous emulsion, comprising: forming a blend by blending with the aqueous emulsion an amount of the pH-responsive copolymer of claim 12 to thicken the aqueous emulsion when pH of the blend is adjusted to a pH in the range of about 6.5 to about 11.

19. The copolymer of claim 11, wherein the at least one $C_3$-$C_8$ alpha beta-ethylenically unsaturated acidic monomer is at least one $C_3$-$C_8$ alpha beta-ethylenically unsaturated carboxylic acid monomer.

20. The copolymer of claim 13, wherein the at least one $C_3$-$C_8$ alpha beta-ethylenically unsaturated acidic monomer is at least one $C_3$-$C_8$ alpha beta-ethylenically unsaturated carboxylic acid monomer.

* * * * *